United States Patent [19]

Schildt

[11] Patent Number: 4,991,340
[45] Date of Patent: Feb. 12, 1991

[54] ANIMAL TRAP

[76] Inventor: Walter C. Schildt, 1707- 69th Ave., N., #240, Brooklyn Center, Minn. 55430

[21] Appl. No.: 498,808

[22] Filed: Mar. 23, 1990

[51] Int. Cl.$^5$ .......................................... F01M 23/26
[52] U.S. Cl. .......................................................... 43/81
[58] Field of Search .................. 43/81, 81.5, 82, 83, 43/92, 77, 88

[56] References Cited

U.S. PATENT DOCUMENTS

| | | | |
|---|---|---|---|
| 1,083,125 | 12/1913 | Nebel | 43/44 |
| 2,574,322 | 11/1951 | Fitzsimons | 43/81 |
| 2,590,316 | 3/1952 | Heal | 43/83 |
| 4,366,642 | 1/1983 | Gardner et al. | 43/82 |
| 4,665,644 | 5/1987 | Vajs et al. | |
| 4,803,799 | 2/1989 | Vajs et al. | 43/82 |

Primary Examiner—Richard K. Seidel
Assistant Examiner—James Miner
Attorney, Agent, or Firm—Lawrence M. Nawrocki

[57] ABSTRACT

A mousetrap having a lower jaw and an upper jaw pivotal relative to the lower jaw at hinge posts received in upwardly facing sockets. A single continuous garter spring surrounds the lower and upper jaws to hold the jaws together in an assembled relationship. The spring is secured to the lower and upper jaws such that the longitudinal centerline of the spring is aligned with or slightly behind the pivot axis of the upper jaw when the upper jaw is fully open. Thus, the spring exerts no closing force on the jaws in the open position thereof. The spring exerts such a closing force only when the upper jaw is rotated slightly forwardly by a trigger operated by the mouse in attempting to remove bait.

18 Claims, 4 Drawing Sheets

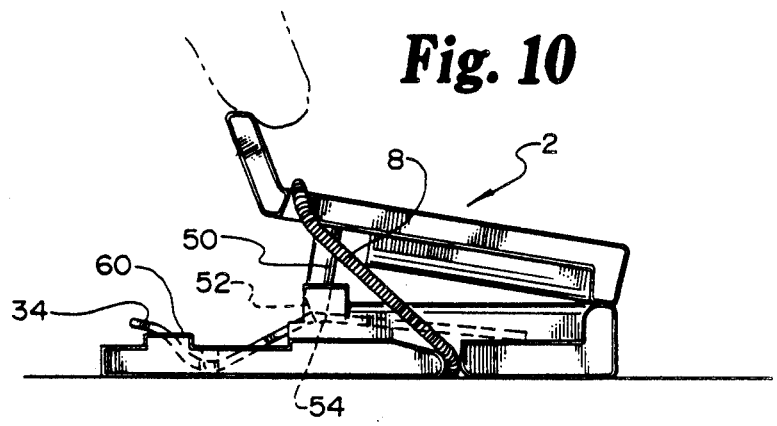
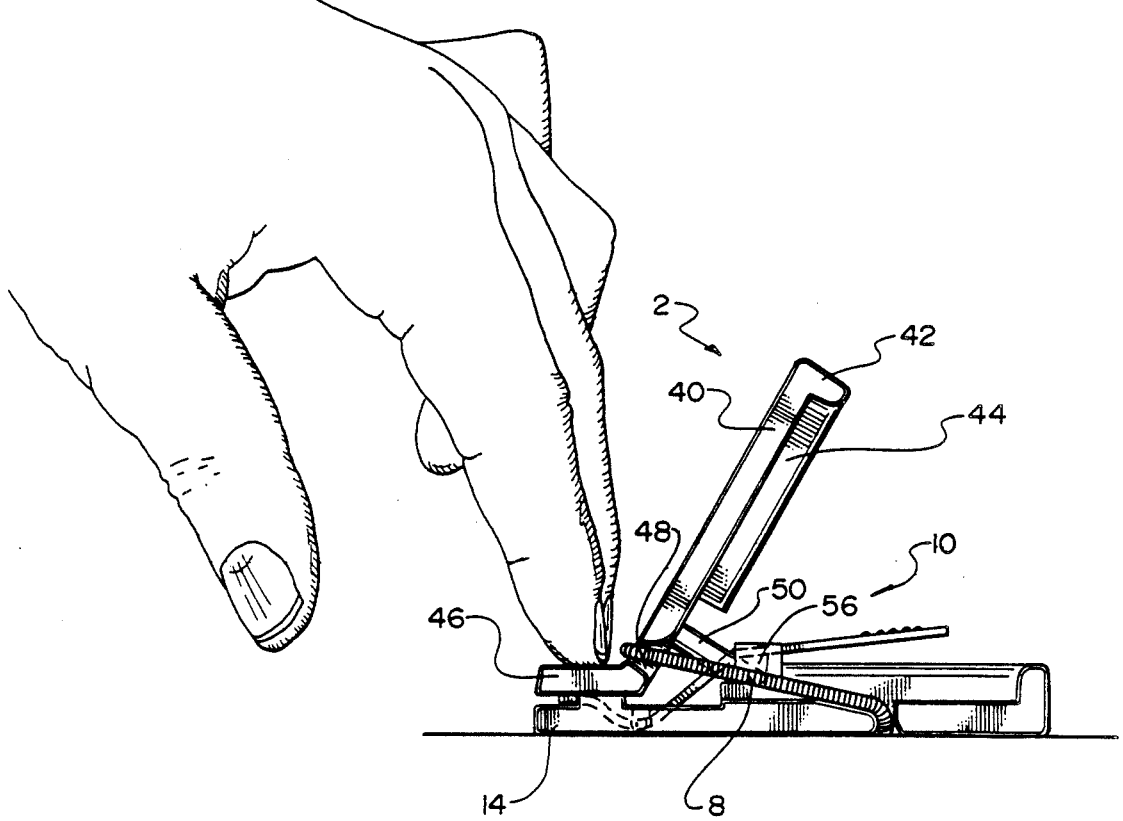

ANIMAL TRAP

TECHNICAL FIELD

The present invention relates generally to an improved trap for trapping small animals, such as mice. More particularly, the present invention relates to a trap in which a single continuous spring is used for holding the jaws of the trap together, and for providing both the opening force for holding the jaws open as well as the closing force which causes the jaws to snap together when the trap is sprung.

BACKGROUND OF THE INVENTION

Mice are any of the numerous small rodents of the family Muridae, especially of the genus Mus, introduced into the United States from Europe and now of wide distribution. While mice often live outdoors, they also establish themselves in human-occupied structures, such as houses, office buildings, etc. They can cause damage in such locations by chewing through walls, insulation, electrical wiring, etc. Mice also pose a health threat since they can transmit various diseases harmful to humans, especially through food contamination. Thus, most people find mice to be annoying and undesirable pests, and normally wish to exterminate them.

Mousetraps are well known devices used to catch, and usually to kill, mice. Such a trap is set in an open position, is baited with food attractive to mice, and is then left unattended. If a mouse comes along and attempts to take the bait, the trap will spring shut with the jaws thereof closing together on the mouse, thereby killing the mouse. The user will eventually find the mouse when checking the trap, can open the trap and dispose of the dead mouse, and can then reset the trap to catch another mouse.

One very common mousetrap has a rectangular wooden base with a U-shaped metal bail pivoted to the base between the ends thereof. A torsion spring normally urges the bail into a closed or sprung position in engagement with one end of the base. To set the trap, the user swings the bail against the force of the spring into engagement with the other end of the base, i.e. by rotating the bail approximately 180° from its closed position. The bail is held in this set position by a catch that prevents the bail from closing. The trap includes a bait platform or trigger connected to the catch. When a mouse enters the trap and tries to take the bait, the catch is moved out of the way of the bail, and the bail snaps shut under the force of the torsion spring. The mouse is trapped between the bail and the base with enough force to kill it.

While traps of the type noted above are generally effective, they have a number of disadvantages. First, they can be tricky to set. The user has to swing and hold the bail down under tension while the catch is put in place. If this is not done properly, the bail can release accidentally, pinching the user's fingers. Moreover, the bail, when set, is under a constant spring force tending to close the bail. This puts stress on the components and will also unintentionally close the bail if the catch should slip slightly, thereby rendering the trap useless for its intended function. Finally, various eyelets or the like, or pivot rods, have to be used to pivotally mount the bail or other movable jaw component. These parts add complexity and expense to the trap.

U.S. Pat. No. 1,083,125 to Nebel discloses a mousetrap having a U-shaped pivotal bail bent to form pivot rod portions for pivotally journalling the bail in a rectangular base. A spring connects a lever arm attached to the bail to an outwardly extending support flange on the base. When the bail is placed in its open position to set the trap, the spring centerline is aligned with the support flange so that the spring does not exert a closing force on the bail. The trap includes an L-shaped trigger which pivots slightly when a mouse steps on it. The pivotal movement of the trigger pivots the bail to move the spring off dead center, thereby allowing the spring to become effective to snap the bail shut.

While Nebel discloses a mousetrap which is not constantly biased toward a closed position, it also has a number of disadvantages. It again requires the user to grab and rotate the bail, thereby putting the user's fingers at risk if he should let go before the bail is properly set, i.e. before the spring has reached the dead center position. In addition, the spring is external to the base, and is subject to being tampered with or accidentally jarred. This could cause the trap to be unintentionally tripped.

SUMMARY OF THE INVENTION

The present invention relates to a mousetrap or the like which comprises a first jaw and a second jaw. The second jaw is pivotally secured to the first jaw for movement between an open position, in which the jaws are spaced apart, and a closed position, in which the jaws are closed against one another. The trap also includes a single continuous spring encircling the jaws for closing the jaws.

Another aspect of this invention is a trap of the general type set forth above in which the spring is retained on the first and second jaws at particular attachment points. These attachment points are selected in relation to the pivot point for the second jaw such that the spring exerts no closing force on the second jaw in the open position of the jaws.

The present invention is, thus, an improved mousetrap. More specific features and advantages obtained in view of those features will become apparent with reference to the DETAILED DESCRIPTION OF THE INVENTION, appended claims, and accompanying drawing figures.

BRIEF DESCRIPTION OF THE DRAWINGS

FIG. 10 is a side elevational view similar to FIG. 6, particularly illustrating the user about to begin pushing down on the upper jaw to set the trap; and FIG. 11 is a side elevational view similar to FIG. 10, particularly illustrating the user having pushed down on the upper jaw to open the jaws and set the trap.

DETAILED DESCRIPTION

Figure 1:
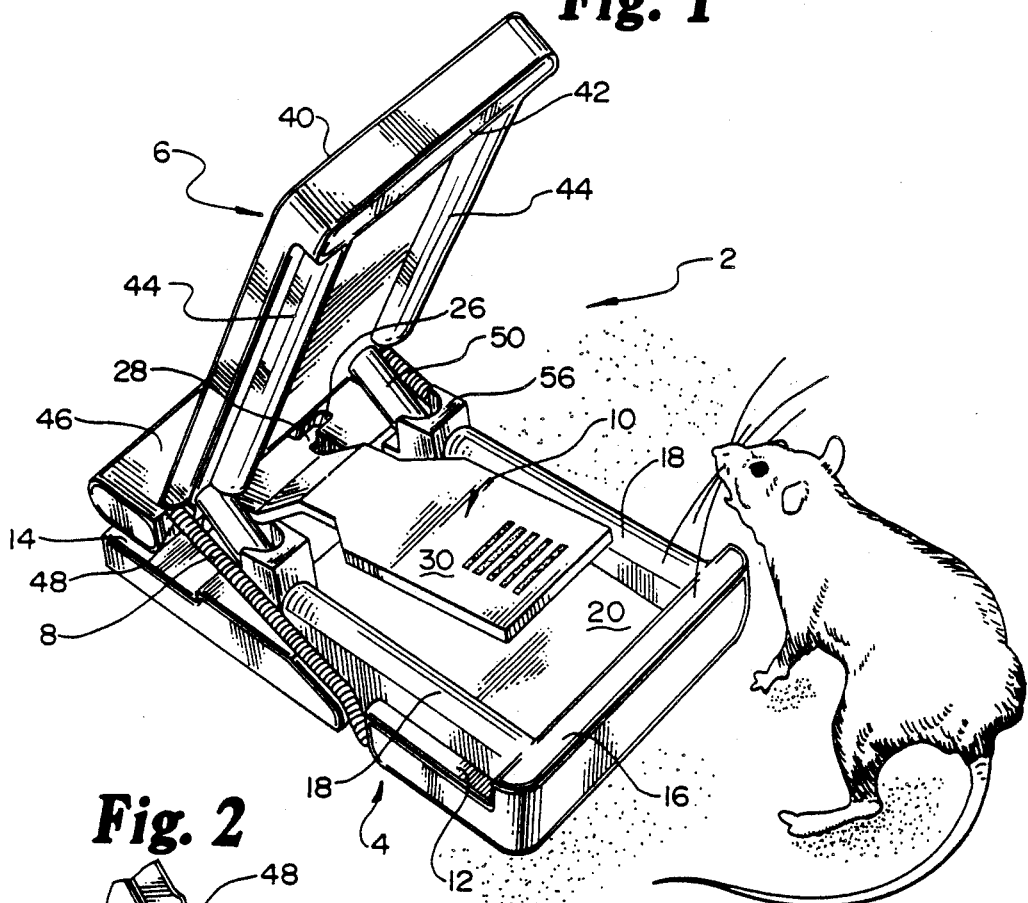
FIG. 1 is a perspective view of an improved mousetrap according to this invention, illustrating the trap in its open or set position and a mouse adjacent the trap.
Figure 2:
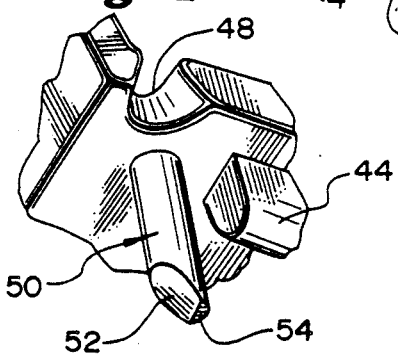
FIG. 2 is an enlarged perspective view of a portion of the trap shown in FIG. 1, particularly illustrating a portion of the upper jaw and a hinge post thereon.

Referring now to the drawings, an improved mousetrap according to the present invention is illustrated generally as 2. Mousetrap 2 has only a few components, thereby descreasing its manufacturing cost while increasing its simplicity and durability. The components of mousetrap 2 include a fixed lower jaw 4, a pivotal upper jaw 6, a single continuous tension spring 8, and a teeter-totter trigger 10. Jaws 4 and 6 and trigger 10 may be made of any suitable materials, including being molded from a high strength plastic or being cut or machined of wood or metal.

Lower jaw 4 is substantially rectangular having a trap portion 12 at one end and a grip portion 14 at the other end. Trap portion 12 is defined by a front, upwardly extending rib 16 and two spaced side ribs 18 that extend rearwardly from front rib 16. See FIGS. 1, 6 and 7. Ribs 16 and 18 define a shallow compartment 20 in which the bait platform 30 of trigger 10 is contained.

The underside of lower jaw 4 includes a lateral groove 22 which extends across the lower jaw from one side to the other. Groove 22 is shaped to receive therein a portion of continuous spring 8. In addition, lower jaw 4 includes a rectangular opening 24 in grip portion 14. See FIG. 7. The wall defining opening 24 includes two notches 26 in which trunnions 28 on trigger 10 are received to pivotally journal trigger 10 in lower jaw 4.

Trigger 10 includes a bait platform 30 which extends upwardly and forwardly from trunnions 28. Bait platform 30 can have a plurality of lateral grooves 32 in its forward end in which an appropriate bait material may be placed.

Figure 6:
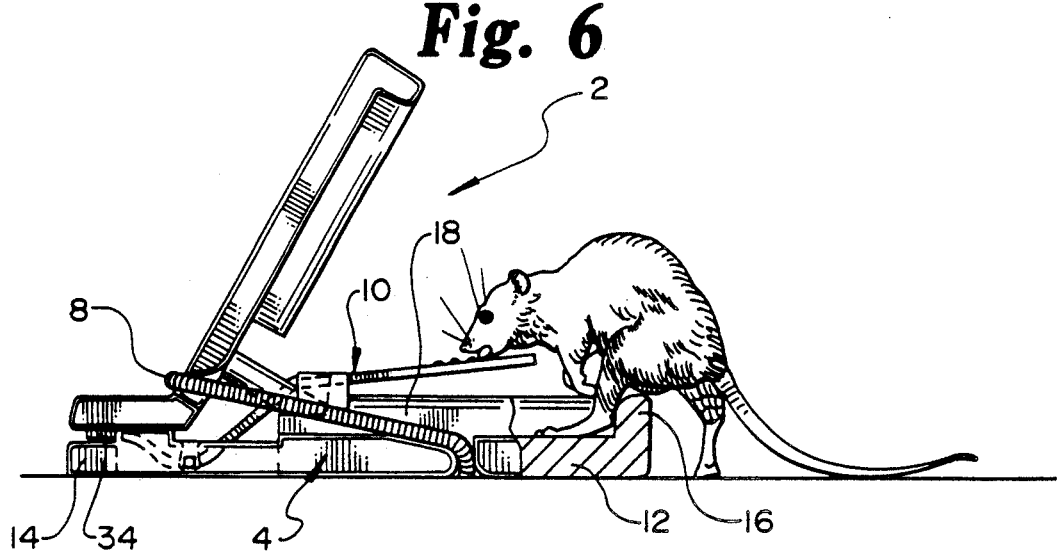
FIG. 6 is a side elevational view of the trap shown in FIG. 1, with portions thereof shown in cross-section, particularly illustrating the trap in its open position with a mouse approaching the bait platform.
Figure 7:
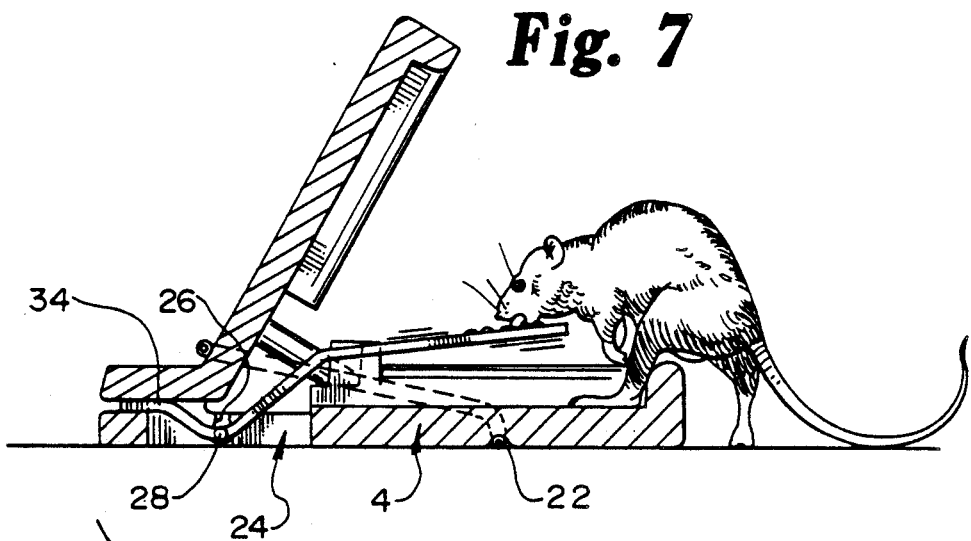
FIG. 7 is a side elevational view similar to FIG. 6, but illustrating the mouse eating the bait on the bait platform of the trigger with the trap about to spring shut.
Figure 8:
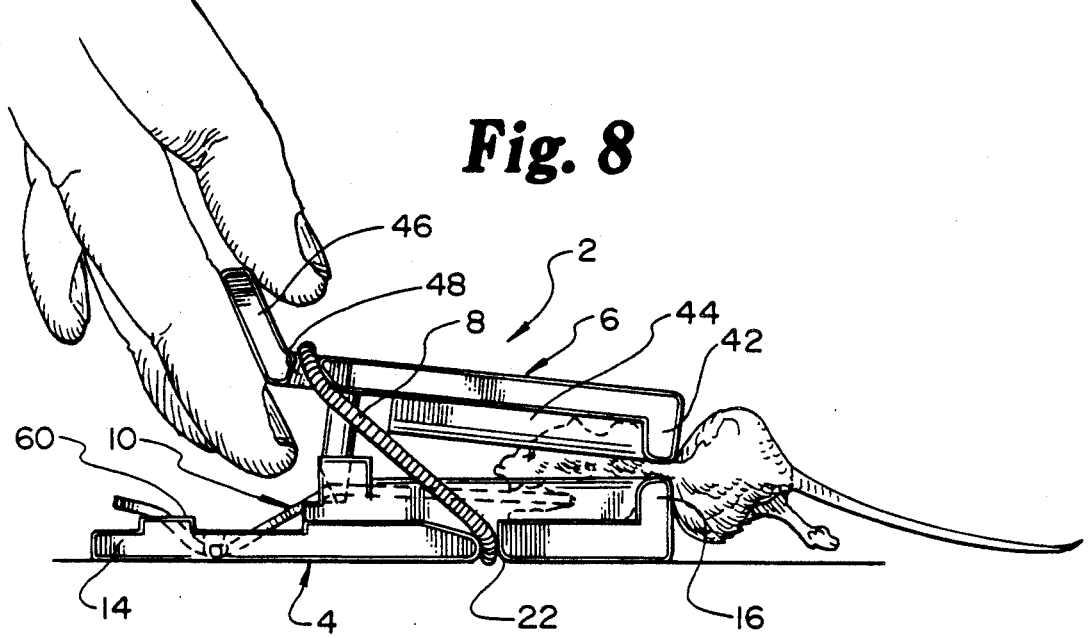
FIG. 8 is a side elevational view similar to FIGS. 6 and 7, but illustrating the trap having been sprung and the mouse killed.

In addition, trigger 10 includes a lever arm 34 which extends upwardly and rearwardly from trunnions 28. When trigger 10 is placed into lower jaw 4 with trunnions 28 received in notches 26, bait platform 30 will be as shown in FIG. 1, i.e. located between side ribs 18 in trap portion 12 of lower jaw 4 in a slightly upwardly inclined orientation. Lever arm 34 will extend rearwardly to be sandwiched between grip portion 14 of lower jaw 4 and grip portion 46 of upper jaw 6, as shown in FIG. 6.

Upper jaw 6 is similar to lower jaw 4 in that it is generally the same size as lower jaw 4 and overlies the lower jaw 4. Upper jaw 6 includes a forwardly extending trap portion 40 having a series of front and side ribs 42 and 44, respectively, which abut against the corresponding ribs 16 and 18 of lower jaw 4 when the trap is sprung and the jaws are closed.

In addition, upper jaw 6 includes a rearwardly extending grip portion 46 which is disposed at an angle relative to trap portion 40, i.e. at approximately 60°, so that upper jaw 6 can be thought of as being generally L-shaped. When upper jaw 6 is in its open position, lever arm 34 virtually bears against grip portion 46 for a purpose as will be discussed hereinafter.

The sides of upper jaw 6 have semi-circular notches 48 at approximately the junction between trap portion 40 and grip portion 46. Notches 48 are sized to receive spring 8 therein to anchor the spring to upper jaw 6 at particular attachment points.

Upper jaw 6 is provided with two circular hinge posts 50, proximate the rear of each of the side ribs 44, extending downwardly from upper jaw 6. Hinge posts 50 each terminate in a free end which may have a beveled flat surface 52 and a slightly rounded tip 54.

Hinge posts 50 rest in semi-circular, upwardly facing sockets 56 at the end of each side rib 18 in lower jaw 4. Sockets 56 can each include a flat bottom surface defining the floor 58 of socket 56.

In assembling mousetrap 2, trigger 10 is first inserted into lower jaw 4 by pressing trunnions 28 into the appropriate notches 26 on each side of opening 24 in lower jaw. Then, upper jaw 6 is placed over lower jaw 4 with hinge posts 50 inserted into corresponding sockets 56. The single continuous garter spring 8 is then placed around the upper and lower jaws by spreading the spring apart and slipping it over the grip ends of the jaw. This is continued until spring 8 is received in transverse groove 22 in lower jaw 4, extends upwardly therefrom to pass through the side notches 48 on upper jaw 6, and then extends across and on top of upper jaw 6. See FIGS. 1 and 6. When spring 8 is so applied and then released, spring 8 will compress to hold the upper and lower jaws together without any other additional attachment means.

Figure 4:
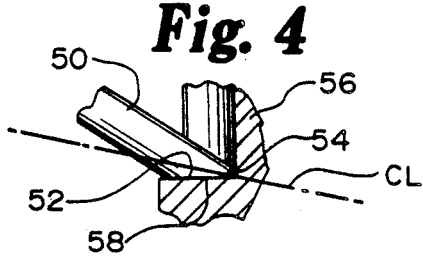
FIG. 4 is an enlarged cross-sectional view of a portion of the trap shown in FIG. 1, particularly illustrating a hinge post received in one of the sockets and the longitudinal centerline of the spring in an open position of the trap.
Figure 3:
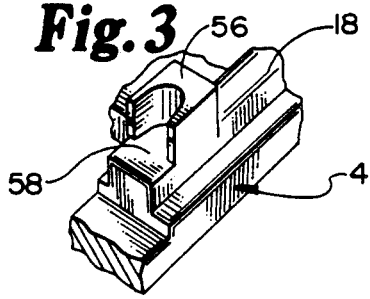
FIG. 3 is an enlarged perspective view of a portion of the trap shown in FIG. 1, particularly illustrating a portion of the lower jaw and a socket thereon for receiving one of the hinge posts.
Figure 5:
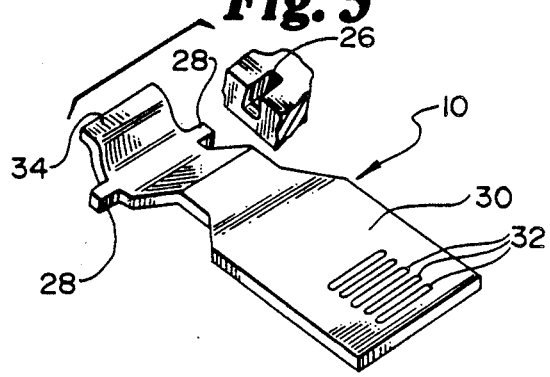
FIG. 5 is a perspective view of the teeter-totter trigger of the trap shown in FIG. 1, illustrating the trunnion and slot connection with the lower jaw.

The spring receiving groove 22 in lower jaw 4, the location of hinge posts 50, and the spring receiving notches 48 on upper jaw 6 are not randomly located, but have precise locations. Specifically, when upper jaw 6 is fully open relative to lower jaw 4, defined by engagement of stops 60 by grip portion 46 of upper jaw 6, then the longitudinal centerline of the spring will pass either through or slightly beyond the rounded tip 54 of hinge post 50. See FIG. 4 in which the centerline is identified by the line marked C1. In this position, spring 8 actually acts to hold upper jaw 6 open relative to lower jaw 4, as shown in FIG. 6. Trigger 10 has bait platform 30 tipped upwardly, and lever arm 34 of trigger 10 is loosely sandwiched between the grip portions (46, 14) of the upper and lower jaws (6, 4).

When a mouse enters trap 2, set in its open position as shown in FIG. 6, it will attempt to remove the bait from bait platform 30. In doing so, it will push down on trigger 10, thereby raising lever arm 34 to push upwardly on the underside of grip portion 46 of upper jaw 6. This action urges upper jaw 6 in a clockwise direction, as viewed in the figures, about the transverse pivot axis represented by the rounded tips 54 of hinge posts 50. After a slight amount of such rotation effected by lever arm 34, the centerline of spring 8 will move from being aligned with or slightly behind tips 54 to being in front of the tips 54. When this happens, spring 8 now acts to close upper jaw 6, rather than hold it open as before. In fact, spring 8 will cause upper jaw 6 to snap shut against lower jaw 4, thereby trapping the mouse between the mating front and side ribs on the upper and lower jaws. It will be able to be seen that, as upper jaw 6 continues to rotate, the moment arm of spring 8 (that is, the distance between the centerline of spring 8 and the pivot axis defined by the rounded tips 54 of hinge posts 50) will become increasingly larger. As the moment arm increases, the effect of closing upper jaw 6 will commensurately increase, assuming a constant force being applied by spring 8. Given a sufficiently strong spring, trap 2 will be effective to kill the mouse as it closes.

Figure 9:
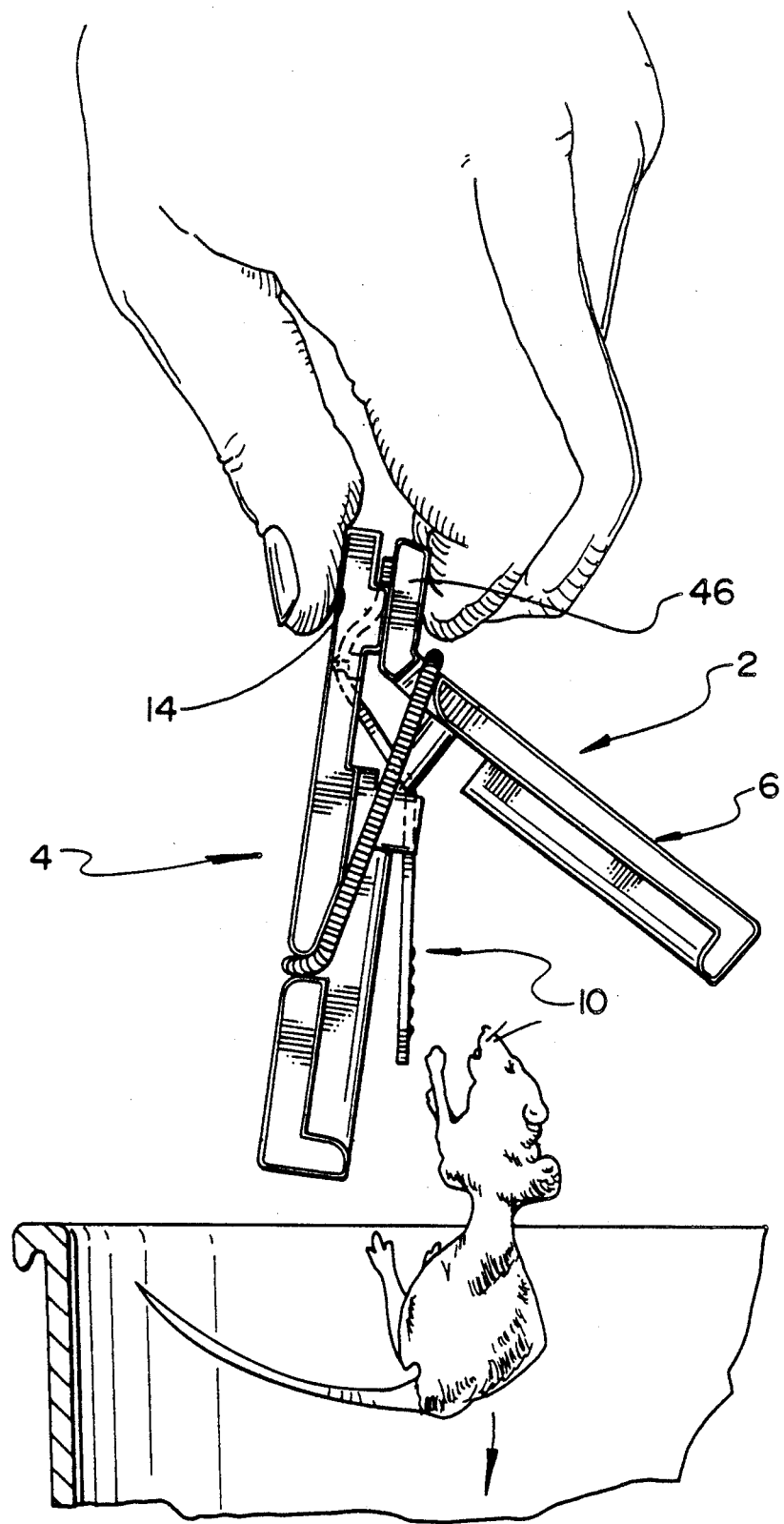
FIG. 9 is a side elevational view of the trap shown in FIG. 1, particularly illustrating the grip portions of the trap being manipulated to release the mouse from the trap into a waste receptacle.

The user will at some point discover that trap 2 has been sprung and a mouse has been caught. Trap 2 can then be picked up and carried until it is located over a waste receptacle. Then, if trap 2 is inverted until the dead mouse is above the waste receptacle, trap 2 can be easily opened merely by squeezing the grip portions 14 and 46 of lower and upper jaws 4 and 6 together. See FIG. 9. This opens the jaws and allows the dead mouse to drop out into the waste receptacle.

Trap 2 can then be easily reset, as shown in FIGS. 10 and 11. All that is required is for trap 2 to be put back on the floor with the lower jaw 4 in contact with the floor. Then, the user simply pushes down on grip portion 46 of upper jaw 6, thereby pivoting upper jaw 6 rearwardly about the tips of hinge posts 50. The trap portion 40 of upper jaw 6 elevates relative to lower jaw 4. This downward force on grip portion 46 of upper jaw 6 is continued until the upper jaw reaches its fully open position where hinge posts 50 cannot rotate any farther since grip portion 46 has engaged stops 60. The centerline of spring 8 has now become aligned with or slightly behind the rounded tips 54 of hinge posts 50. Thus, when the user stops pressing down on grip portion 46 of upper jaw 6 and removes his hand, upper jaw 6 will remain in its open position with spring 8 helping bias it into that position.

Mousetrap 2 according to this invention has a number of obvious advantages over prior art traps. First, it is made of a number of simple components held together by a single spring. Thus, separate pivot rods or pivot pins are not required in its manufacture, and the spring 8 that provides the closing force is also used to keep the upper and lower jaws together with the hinge posts 50 received in sockets 56. Accordingly, trap 2 is simple and durable, yet relatively inexpensive to manufacture.

Secondly, spring 8 in the open position of trap 2 does not put a closing force on the upper jaw, but in fact helps hold the upper jaw open. Thus, the components of trap 2 are not under constant stress and the trap is less likely to be accidentally tripped.

In addition, when setting trap 2, there is no need for the user to put his fingers between the jaws to manipulate bails or catches or the like. The user simply pushes down on grip portion 46 of upper jaw 6 until that jaw 6 is fully open. If the user lets go of the upper jaw before it is fully open, upper jaw 6 will spring shut. However, there is no harm to the user in that event since his fingers were never between the jaws.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. An improved animal trap, which comprises:
   (a) a first jaw;
   (b) a second jaw pivotaly mounted to the first jaw for movement between an open position in which the jaws are spaced apart, and a closed position in which the jaws are closed against one another; and
   (c) a single continuous spring for closing the jaws, said spring encircling the jaws and being retained on the first and second jaws at attachment points selected in relation to a pivot point for the second jaw such that the spring exerts no closing force on the second jaw in the open position of the jaws.

2. An improved animal trap, which comprises:
   (a) a first jaw;
   (b) a second jaw pivotally secured by pivot means to the first jaw for movement between an open position in which the jaws are spaced apart and a closed position in which the jaws are closed against one another, said pivot means comprising at least one hinge member carried on one of the jaws and at least one bearing member on the other jaw, the bearing member having socket means in which the hinge member is inserted; and
   (c) spring means for holding the jaws in an assembled relationship, said spring means pressing the hinge member into the socket means to hold the first and second jaws together.

3. An improved animal trap as recited in claim 2, wherein the pivot means includes stop means for defining the open position of the second jaw relative to the first jaw.

4. An improved animal trap as recited in claim 3, wherein the hinge member comprises a circular hinge post having a rounded tip and a beveled flat surface on a free end thereof, wherein the socket means includes a semicircular socket having a flat floor, and wherein the hinge post is received in the socket for rotation about the rounded tip thereof.

5. An improved animal trap as recited in claim 4, wherein the spring means includes a single continuous spring encircling the first and second jaws.

6. An improved animal trap as recited in claim 5, wherein the spring is attached to the jaws such that, in the open position of the second jaw, the centerline of the spring is either aligned with or slightly behind the rounded tip of the hinge post such that the spring does not exert a closing force on the second jaw.

7. An improved animal trap as recited in claim 6, further including a pivotal trigger on the first jaw having a lever arm interposed between the first and second jaws, and wherein an animal will pivot the trigger causing the lever arm to act on the second jaw to pivot the second jaw about its pivot point, wherein a relatively slight amount of rotation will cause the centerline of the spring to move in front of the rounded tip of the hinge post, thereby allowing the spring to cause the second jaw to snap shut.

8. An improved animal trap as recited in claim 6, wherein the first jaw is provided with a transverse groove in which the spring is received, wherein the second jaw is provided with notches at each side in which the spring is received before passing across the second jaw, and wherein a straight line between the groove and the notches will pass through or slightly behind the rounded tip of the hinge post when the second jaw is open.

9. An improved mousetrap, which comprises:

(a) a lower jaw that may be laid on a flat surface, the lower jaw having a forwardly extending trap portion and a rearwardly extending grip portion;

(b) an upper jaw having a forwardly extending trap portion and a rearwardly extending grip portion disposed at an angle relative to the upper jaw trap portion;

(c) means for pivotally securing the upper and lower jaws together to define an open position in which the grip portions of the jaws are adjacent one another and the trap portions are spaced from one another, and a closed position in which the grip portion of the jaws are spaced from one another and the trap portions are adjacent one another, the pivotal means defining a generally transverse pivot axis extending between the upper and lower jaws;

(d) a teeter-totter trigger pivotally contained in the lower jaw, wherein the trigger has a forwardly extending bait platform received in the trap portion of the lower jaw and a rearwardly extending lever arm received between the grip portions of the upper and lower jaws, the trigger being pivotal to raise the lever arm to act on the upper jaw to pivot the upper jaw about the pivot axis; and (e) spring means for exerting a closing force on the jaws to move the upper jaw into its closed position relative to the lower jaw, the spring means being connected to the lower and upper jaws at particular attachment points along the jaws, the attachment points for the spring means being selected in relation to the pivot axis such that the centerline of the spring means, in the open position of the jaws, is either aligned with or slightly behind the pivot axis so that the spring means exerts no closing force on the upper jaw in the open jaw position, and wherein a relatively small amount of rotation of the upper jaw about the pivot axis is effective to move the centerline of the spring means forwardly of the pivot axis to allow the spring means to close the jaws.

10. An improved mousetrap as recited in claim 9, wherein the grip portions of the upper and lower jaws are sufficiently elongated to allow the user to open the jaws by squeezing the grip portions together.

11. An improved mousetrap as recited in claim 9, wherein the spring means comprises a single continuous spring encircling the lower and upper jaws.

12. An improved mousetrap as recited in claim 11, wherein the lower jaw includes a relatively planar base that is suited to be laid flat on the flat surface, wherein the planar base of the lower jaw includes a transverse groove extending from side-to-side thereon which groove is sized to receive a portion of the spring therein so that the spring is contained within the planar base of the lower jaw and will not disturb the flat orientation thereof, the groove comprising the attachment point of the spring to the lower jaw.

13. An improved mousetrap as recited in claim 12, wherein the spring extends upwardly from the lower jaw to pass around each side of the upper jaw and over the top thereof in a continuous manner at approximately the juncture of the grip and trap portions of the upper jaw.

14. An improved mousetrap as recited in claim 12, wherein the spring extends upwardly from the lower jaw to pass around each side of the upper jaw and over the top thereof in a continuous manner, further including notches at each side of the upper jaw through which the spring passes such that the notches serve as the attachment point of the spring to the upper jaw.

15. An improved mousetrap as recited in claim 14, wherein the pivot means comprises a plurality of downwardly extending hinge posts located on the upper jaw and a plurality of upwardly facing sockets, the spring serving to retain the upper and lower jaws in an assembled position by pressing the hinge posts into the sockets.

16. An improved mousetrap as recited in claim 15, wherein each hinge post includes a rounded pivot portion and an adjacent flat portion.

17. An improved mousetrap as recited in claim 16, wherein a longitudinal line passing through the center of the groove on the lower jaw and the center of one of the side notches on the upper jaw will pass through or slightly behind the rounded pivot portion of the hinge posts when the jaws are open.

18. An improved mousetrap as recited in claim 9, wherein the lower jaw includes an opening in which the trigger is pivotally mounted, and further including a trunnion and slot connection for pivotally mounting the trigger in the lower jaw.

* * * * *